Sept. 6, 1932.  R. K. WINNING  1,875,791

FRICTION DETENT FOR CONTROL RODS

Filed Jan. 31, 1930

Inventor
Robert K. Winning
By Wheeler, Wheeler & Wheeler
Attorneys

Patented Sept. 6, 1932

1,875,791

UNITED STATES PATENT OFFICE

ROBERT K. WINNING, OF WAUWATOSA, WISCONSIN, ASSIGNOR TO CLUM MANUFACTURING COMPANY, OF MILWAUKEE, WISCONSIN, A CORPORATION OF WISCONSIN

FRICTION DETENT FOR CONTROL RODS

Application filed January 31, 1930. Serial No. 424,834.

This invention relates to improvements in friction detents for control rods.

It is the object of the invention to provide a novel and improved friction detent device in which an embossed spring provides a constant sliding friction at intermediate points in the adjustment of the rod, and operates as a friction detent at predetermined stations in the adjustment thereof.

In the drawing.

Like parts are identified by the same reference characters throughout the several views.

Figure 1:
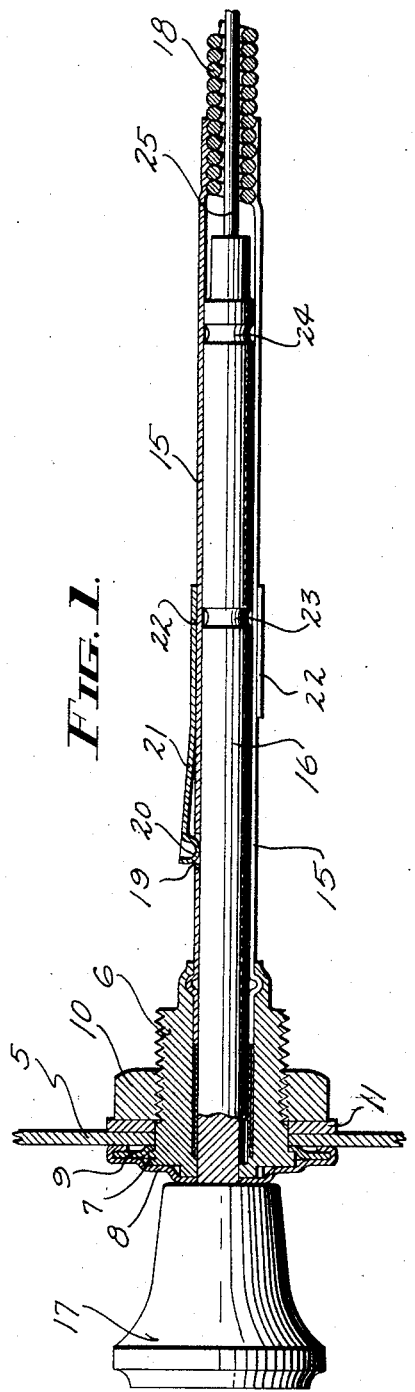
Figure 1 is an axial section of a device embodying this invention.
Figure 2:
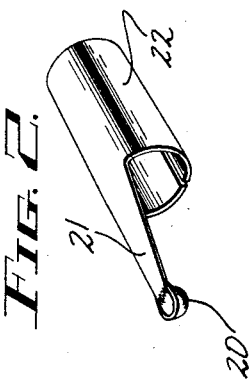
Figure 2 is a detail view of the improved detent spring.

Mounted in the panel 5 is a support comprising a tubular externally threaded member 6 flanged at 7, a finish plate 8 for said member upset about a mounting plate 9 engaged behind the flange 7, and a mounting nut 10 on the threads of member 6 to engage the panel and washer 11.

The support carries a tubular housing 15 for the control rod 16 which is axially slidable in the housing and through the supporting sleeve 6. Externally of such sleeve and the finish plate 8 thereof, the control rod is provided with a knob or handle 17. At its opposite end it is connected with a Bowden wire 25, of which the sheath 18 is anchored in the end of the housing 15. The general organization corresponds to my companion co-pending application No. 378,120 filed July 13, 1929.

In accordance with this invention the housing 15 is apertured at 19 to receive the embossed pressure transmitting portion 20 of a detent spring 21 which comprises an integral extension of a sleeve 22 embracing the outside of the housing. Throughout the axial reciprocation of rod 16 the embossed pressure applicator 20 will travel upon the surface of the rod and maintain frictional resistance to its movement.

The rod 16 is peripherally grooved at 23 and 24 and in any rotative position of the rod the pressure applicator boss 20 will engage in either of the grooves 23 or 24 which registers with the hole 19 in the casing. By such engagement the device provides an impositive detent which accurately defines predetermined positions of the rod in a manner tangible to the operator.

I claim:

1. In a control device, the combination with a tubular casing and a rod reciprocable therein, said casing being apertured, of a sleeve frictionally embracing the casing and provided with a spring finger having an integral spherically embossed portion projecting through the aperture into engagement with said rod, said embossed portion being urged into said engagement by said spring, said rod having a depression registerable with said aperture in which the embossed portion of said finger is yieldably and impositively engageable.

2. In a device of the character described, the combination with an apertured casing, of a friction applicator having a resilient arm slidably engaging the outer surface of the casing and comprising a hemispherical protuberance projecting into said aperture, said arm urging said protuberance into said aperture and into the subsequently mentioned groove when the latter is in registry with the aperture, and a rod slidable in the casing and having an annular groove semicircular in transverse section, whereby the applicator will releasably engage the rod in said groove.

3. In a control device, the combination with a tubular casing having an aperture, of a rod reciprocable in the casing and having an annular groove semicircular in transverse section, a sleeve frictionally embracing the casing, a spring arm integrally connected with said sleeve and extending to said aperture, a hemispherical protuberance at the extended end of said arm and integral therewith, said protuberance extending into said aperture and being complementary to said groove, said arm urging said protuberance into said aperture and into said groove when the latter is in registry with the aperture.

4. In a control device the combination with a tubular casing having an aperture, of a rod reciprocable in the casing and having an annular groove registering in certain positions of adjustment of said device with said aperture, a control device for said rod including a sleeve frictionally embracing said casing and having fixed therewith a spring arm extending to said aperture, a protuberance fixed with said spring arm, extending into and engaging said aperture to prevent displacement of said control device on said casing, said protuberance also frictionally engaging said rod to yieldingly maintain said rod in an infinite variety of adjusted positions, and engaging said groove when the latter is in registry with said aperture, providing an impositive detent accurately defining a predetermined position of said rod in a manner tangible to an operator.

ROBERT K. WINNING.